(12) United States Patent
Beckhoff et al.

(10) Patent No.: US 7,702,834 B2
(45) Date of Patent: Apr. 20, 2010

(54) DATA TRANSMISSION METHOD SERIAL BUS SYSTEM AND SWITCH-ON UNIT FOR A PASSIVE STATION

(75) Inventors: Hans Beckhoff, Verl (DE); Holger Büttner, Berlin (DE)

(73) Assignee: Beckhoff Automation GmbH, Verl (DE)

( * ) Notice: Subject to any disclaimer, the term of this patent is extended or adjusted under 35 U.S.C. 154(b) by 953 days.

(21) Appl. No.: 10/499,724

(22) PCT Filed: Dec. 17, 2002

(86) PCT No.: PCT/EP02/14423

§ 371 (c)(1), (2), (4) Date: Jun. 21, 2004

(87) PCT Pub. No.: WO03/054644

PCT Pub. Date: Jul. 3, 2003

(65) Prior Publication Data

US 2005/0114577 A1 May 26, 2005

(30) Foreign Application Priority Data

Dec. 21, 2001 (DE) ................. 101 63 342

(51) Int. Cl.
*G06F 13/00* (2006.01)
(52) U.S. Cl. ............... 710/110; 710/113; 709/251; 711/5; 370/450; 370/452
(58) Field of Classification Search ......... 370/424, 370/249, 316, 407, 450, 452, 455, 503; 709/251; 711/6, 5; 710/4, 110, 113
See application file for complete search history.

(56) References Cited

U.S. PATENT DOCUMENTS

| | | | | |
|---|---|---|---|---|
| 4,037,209 A | * | 7/1977 | Nakajima et al. | 711/207 |
| 4,163,280 A | * | 7/1979 | Mori et al. | 711/207 |
| 4,884,192 A | * | 11/1989 | Terada et al. | 709/251 |
| 4,937,777 A | * | 6/1990 | Flood et al. | 710/107 |
| 5,056,012 A | * | 10/1991 | Spiotta et al. | 709/251 |
| 5,210,866 A | * | 5/1993 | Milligan et al. | 714/6 |
| 5,311,593 A | * | 5/1994 | Carmi | 713/162 |
| 5,321,826 A | * | 6/1994 | Ushiro | 711/162 |
| 5,341,374 A | * | 8/1994 | Lewen et al. | 370/450 |

(Continued)

FOREIGN PATENT DOCUMENTS

EP 0910026 4/1999

(Continued)

OTHER PUBLICATIONS

Compaq et al. Universal Serial Bus Specification. Revision 2.0. Apr. 27, 2000.*

(Continued)

*Primary Examiner*—Mark Rinehart
*Assistant Examiner*—Matthew D Spittle
(74) *Attorney, Agent, or Firm*—Faegre & Benson LLP

(57) ABSTRACT

In a serial bus system data in the form of telegrams, representing process images of control tasks of the active station, are transmitted to the connected passive stations, and the process data are allocated to the process images in the passive station.

32 Claims, 7 Drawing Sheets

U.S. PATENT DOCUMENTS

| | | | | |
|---|---|---|---|---|
| 5,524,230 | A * | 6/1996 | Sakaue et al. | 711/103 |
| 5,890,012 | A * | 3/1999 | Poisner | 710/22 |
| 5,914,957 | A | 6/1999 | Brajczewski et al. | |
| 5,948,075 | A * | 9/1999 | Osten | 710/8 |
| 6,005,869 | A * | 12/1999 | Sakai et al. | 370/452 |
| 6,148,354 | A * | 11/2000 | Ban et al. | 710/301 |
| 6,240,478 | B1 | 5/2001 | Brickell | |
| 6,295,511 | B1 * | 9/2001 | Kemmler | 702/188 |
| 6,320,781 | B1 | 11/2001 | Moriguchi et al. | |
| 6,343,331 | B1 * | 1/2002 | Stirling | 709/251 |
| 6,522,654 | B1 * | 2/2003 | Small | 370/400 |
| 6,557,062 | B1 * | 4/2003 | Shaler et al. | 710/110 |
| 6,606,707 | B1 * | 8/2003 | Hirota et al. | 713/172 |
| 6,629,187 | B1 * | 9/2003 | Krueger et al. | 711/3 |
| 6,675,276 | B2 * | 1/2004 | Schulze et al. | 711/200 |
| 6,754,721 | B2 * | 6/2004 | Heckel | 710/4 |
| 6,763,423 | B2 * | 7/2004 | Stakutis et al. | 711/5 |
| 6,782,464 | B2 * | 8/2004 | Blackmore et al. | 711/202 |
| 6,907,488 | B1 * | 6/2005 | Diehl | 710/305 |

FOREIGN PATENT DOCUMENTS

| | | |
|---|---|---|
| WO | WO0004428 | 1/2000 |

OTHER PUBLICATIONS

Cisco Systems. Token Ring Switching Concepts. Oct. 7, 2005.*
Apollo Computer. Apollo Token Ring Media Access Control Layer and Physical Layer Protocols. Revision 00. Oct. 1987.*
IBM. Networking Token-ring on AS/400. 2000.*
International Search Report for international application No. PCT/EP02/14423, Sep. 16, 2003.

* cited by examiner

DATA TRANSMISSION METHOD SERIAL BUS SYSTEM AND SWITCH-ON UNIT FOR A PASSIVE STATION

This application claims priority to International Application No. PCT/EP02/14423 filed on Dec. 17, 2002, which claims priority to German patent application DE 101 63 342.4 filed on Dec. 21, 2001.

FIELD OF THE INVENTION

The invention relates to a method for transmitting data on a serial bus between at least one active station and at least one passive station, to a correspondingly configured serial bus system, and to a switch-on unit for a passive station in such a serial bus system.

BACKGROUND OF THE INVENTION

Serial bus systems are being used more and more for production and process automation, wherein the decentralized devices of peripheral machines, such as I/O modules, measurement transducers, drives, valves, and operator terminals, communicate by means of a powerful real-time communications system with automation, engineering, or visualization systems. In this way, all instruments are linked to each other by means of one serial bus, preferably a field bus, wherein the data exchange by means of the bus is usually performed on the basis of the master-slave principle.

Here, the active stations on the bus system are the control devices. They are in possession of a bus-access token and determine the data transfer on the bus. The active stations are also called master devices in the serial bus system.

In contrast, passive stations are usually the peripheral machines. They receive no bus-access token, i.e., they are allowed only to acknowledge received messages or transmit messages to active stations upon a request by this active station. Therefore, passive stations are also called slave devices in the serial bus system.

In general, the master devices contain a field-bus switch-on device, which represents the link between the central data processing in the master device and the field-bus network, and which performs bus management. Thus, the switch-on device that is often configured as a separate assembly also implements the complete bus protocol. The slave devices in turn feature an interface module, which converts the data from the slave device into the data format of the field-bus system. Therefore, these interface modules also require only a small portion of the bus protocol.

In automation technology, field-bus systems are used according to the master-slave principle with a wide variety of different transmission rules. For cyclical field-bus systems, e.g., Profibus-DP, ControlNet, FIP-IO, or Interbus-S, the data is transmitted in a cycle independent of whether the data has been changed. In contrast, in acyclical field-bus systems, like those known for CAN systems, data is only transmitted if the data has been changed or if the data transmission is explicitly triggered by the master device.

Further distinctions are also made between stationary-oriented field-bus systems, like Profibus-DP, for which a master device sends a message to a slave device that then acknowledges or answers this message, and message-oriented field-bus systems, like the CAN system, which is distinguished in that the master device outputs unacknowledged messages onto the bus, which can then be processed by all stations. Furthermore, there are also bus-oriented field-bus systems, like Interbus-S, for which the master device transmits a message with all of the data for all of the attached slave devices, wherein the site of the data for the respective slave device is determined by its position In the message block.

Control processes, especially for automation systems used in production, are usually assembled from one or more tasks, which are in general performed in a cycle. Such tasks are performed in a field-bus system so that the slave devices, which represent the peripheral machines, deliver input process data by means of the field bus to the master device, which functions as a process controller. In the master device, the output process data is then generated corresponding to the task to be performed, and is transmitted by the field-bus system to the slave devices.

In the conventional transfer of process data, the process data of the slave devices is output according to the bus protocol used by the interface unit of the appropriate slave device onto the field bus, and received by the field-bus switch-on device as the interface of the master device with the field bus. The field-bus switch-on device in the master device then builds a process image for the appropriate task from the received process data of the slave devices, and forwards this process image to the data processing unit in the master device. The data processing unit in the master device in turn creates an output process image, which is output to the field-bus switch-on device, on the basis of the input process image according to the task to be performed. The field-bus switch-on device then determines the process data for the individual slave devices from this process image and transmits this process data according to the provided bus protocol to the appropriate slave device by means of the field bus.

For the known field-bus systems, the process data transfer between the master device and the slave devices is performed conventionally, so that the process data for the individual process devices is assembled into separate data packets, which are also called telegrams in the following, and the slave devices are then addressed individually.

For the process data transfer, the field-bus switch-on device in the master device must therefore perform a complex allocation between the process data transmitted from and to the slave devices and the input and output process images to be allocated to each task. However, this allocation, which is also called mapping in the following, of process data of the slave devices to the process images, which are used in the master device and which are formed in the field-bus switch-on device of the master device, requires a high processing effort. Therefore, a complex mapping algorithm and protocol sequence must also be installed in the field-bus switch-on device. This applies even more to open field-bus systems, which are designed so that stations can be removed from the overall system and inserted into the system without great expense.

The required conversion of the process data of the individual slave devices into process images in the field-bus controller also leads to significantly delayed processing of processes, especially when several tasks are supposed to be performed simultaneously.

This applies above all when a control application consists of several partial processes, each of which is allocated to a different slave device. For conventional field busses, the process image allocated to the control application is then divided into corresponding individual telegrams for the appropriate slave devices. In contrast, in the event that the process data for one task has to be made available to several slave devices, because all of these slave devices are supposed to perform this task, the field-bus controller must then build a unique telegram with the process data for each slave device.

Furthermore, if the individual partial processes have different cycle times, conventional data transmission methods on the field bus cannot adapt the bus load to the individual partial processes according to the different cycle times, and thus cannot achieve an optimal use of the bus.

In addition, conventional field-bus systems can only with much difficulty provide flexible adaptation of the telegrams to the process data lengths required in the slave devices. Thus, if a slave device requires only 1-bit process data, in general an additional bus coupler with a local bus network is necessary in order to convert this 1-bit process data into the telegrams of the standard field bus.

The problem of the present invention is to refine the known serial bus systems, especially field-bus systems, so that flexible data transmission is possible with reduced data processing effort.

This problem is solved by a method according to claim 1, a serial bus system according to claim 7, and a switch-on unit according to claim 11. Preferred embodiments are given in the dependent claims.

SUMMARY OF THE INVENTION

According to the invention, for transmitting data to a serial bus system with at least one active station and at least one passive station, data in the form of telegrams is transmitted between the active and the passive stations, wherein the telegrams each contain a logical address in order to characterize the transmitted data, wherein the passive station contains an allocation table in which logical addresses of telegrams are correlated with physical addresses of data storage regions of the passive station, and wherein during passage of a telegram on the serial bus the station compares the logical address of the circulating telegram to the logical addresses stored in the allocation table and performs a data exchange with the telegram if a match is identified.

According to the invention, the design of the serial bus or the data transmission onto this serial bus, for which each station can use its switch-on unit to remove or insert any pre-configured data into a data flow transmitted in the form of telegrams, provides high flexibility for the data transmission between the stations with simultaneously low data processing effort. In particular, a simplified process data transmission of control applications is possible between decentralized devices attached to the serial bus.

For the design according to the invention, each decentralized passive device attached to the serial bus uses the allocation table to determine individually which data in the telegrams transmitted on the bus is allocated to the respective decentralized device. In addition, with the help of the telegrams and the allocation tables provided in the passive stations, data can be transmitted according to the respective process requirements and independently of its physical position.

According to the invention, it is especially possible, with the help of the telegrams, to adapt the data flow to the respective requirements of the passive stations, wherein, e.g., telegrams with 1-bit process data can also be realized for passive stations. Thus, economical serial bus systems can be realized without additional bus couplers and local bus networks.

Furthermore, with the help of the data transmission according to the invention, the data flow on the serial bus is adapted to the appropriate cycle times of partial processes, wherein an optimal use of the bus can be achieved.

Furthermore, the configuration according to the invention avoids a complicated mapping process in the active station, with which the process data allocated to the individual passive stations is correlated with the corresponding process images of the control application. The mapping process is already performed in the passive stations themselves, namely by means of the assignment table, wherein the data processing effort in the active station is significantly reduced, and thus considerable time savings are achieved when performing the control tasks. In addition, the device and implementation effort is significantly reduced by shifting the assignment process into the passive stations.

According to a preferred embodiment, in the interface unit of the passive station the stored assignment table is divided into register data sets, each of which gives a logical address of data transmitted by the serial bus in a telegram, a physical address of the data memory assigned to the data in the passive station, and a data transmission mode. The configuration according to the invention of the mapping process and of the data transmission in the passive station provides an especially simple and fast-acting assignment process for only a small implementation and protocol effort in the passive station. In particular, with this design of the assignment process, it is possible in the passive station to perform the data transfer between the telegrams circulating on the serial bus and the data memories assigned to the corresponding passive stations in a simple way.

According to another preferred embodiment, the assignment table in the passive station is generated during an initialization phase, wherein the active station reports to the passive station the logical addresses of data relevant for the passive station in the individual telegrams, and the passive station then correlates the logical addresses with the corresponding physical address of data memories. This configuration enables high flexibility for the data transmission, and in particular adaptation to the respective desired control application. It can be individually reported to the passive stations which process data is transmitted from the active station, i.e., by the control device, and where this process data is located in the telegrams circulating on the serial bus.

BRIEF DESCRIPTION OF THE SEVERAL VIEWS OF THE DRAWINGS

The invention is explained in more detail with reference to the attached drawings. Shown are.

DETAILED DESCRIPTION OF THE INVENTION

Figure 1:
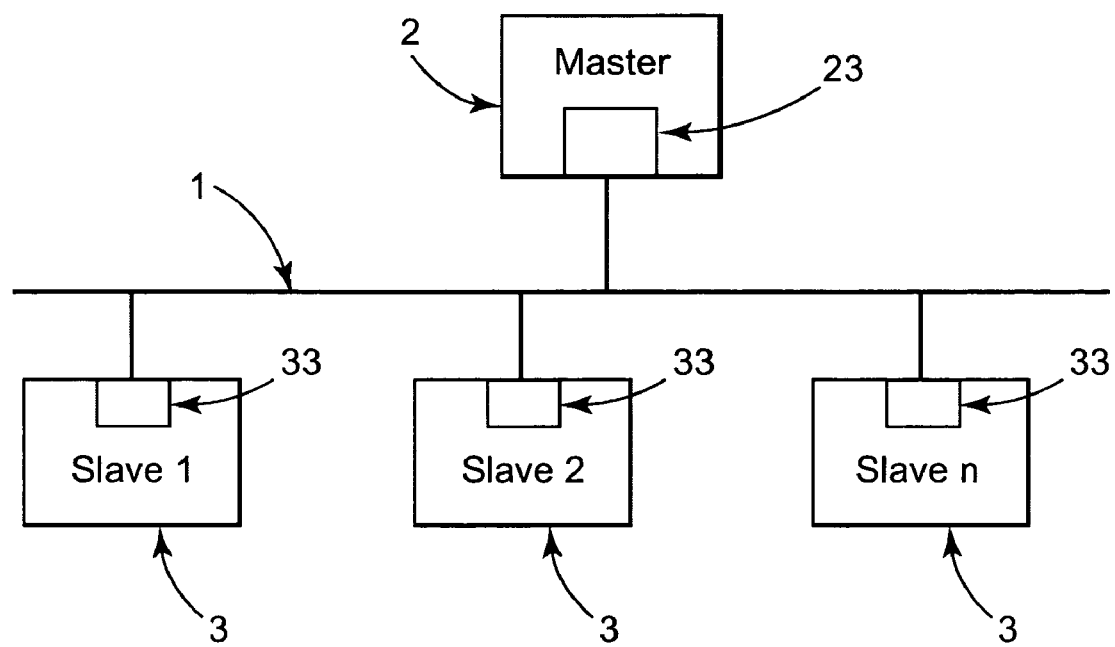
FIG. 1, a schematic diagram of a serial bus system.

More and more field-bus systems are being used in automation technology, wherein distributed devices of the peripheral machines communicate with automation, engineering, and visualization systems by means of a field bus. One such field-bus system is shown in FIG. 1.

The field-bus system has a serial bus 1, which can be, e.g., an electrical line, an optical fiber, or also a radio cable. All of the stations are attached to this bus 1, wherein a distinction can be made between active and passive stations. The active stations on the field-bus system are the master devices 2, which determine the data traffic on the bus. One such master device is, e.g., an industrial PC, which operates as a process control computer in a manufacturing process. This master device 2 has a bus access token and can output data onto the bus 1 without an external request. The passive stations on the bus system are the peripheral machines, e.g., I/O devices, valves, drives, and measurement transducers. They act as slave devices 3 and receive no bus-access token, i.e., they are allowed only to acknowledge received messages or transmit messages to a master device upon a request by the master device.

The master device 2 and the slave devices 3 can be attached directly to the bus 1 or can be connected to this bus by means of standalone interface components. The type of data transmission on the bus 1 is determined by a communications protocol, with a wide variety of protocol architectures being possible as a function of the transmission physics selected for the serial bus 1. This bus protocol is implemented in the master device 2, preferably in a field-bus switch-on device 23. The bus protocol parts necessary for the slave devices 3 are stored in an allocation unit 33.

Processes in automation technology usually consist of various partial processes, which are influenced by different time behaviors. Thus the control applications, which control, monitor, and regulate these processes, generally have several cyclical control tasks with different cycle times which each provide input and output process images. Here the process data is usually distributed to many passive stations, which form the interfaces to the process. The process signals are here updated via the serial bus, depending on the field-bus system, with different methods in the master device with the control applications and in the passive stations, and are represented in process images.

Figure 2:
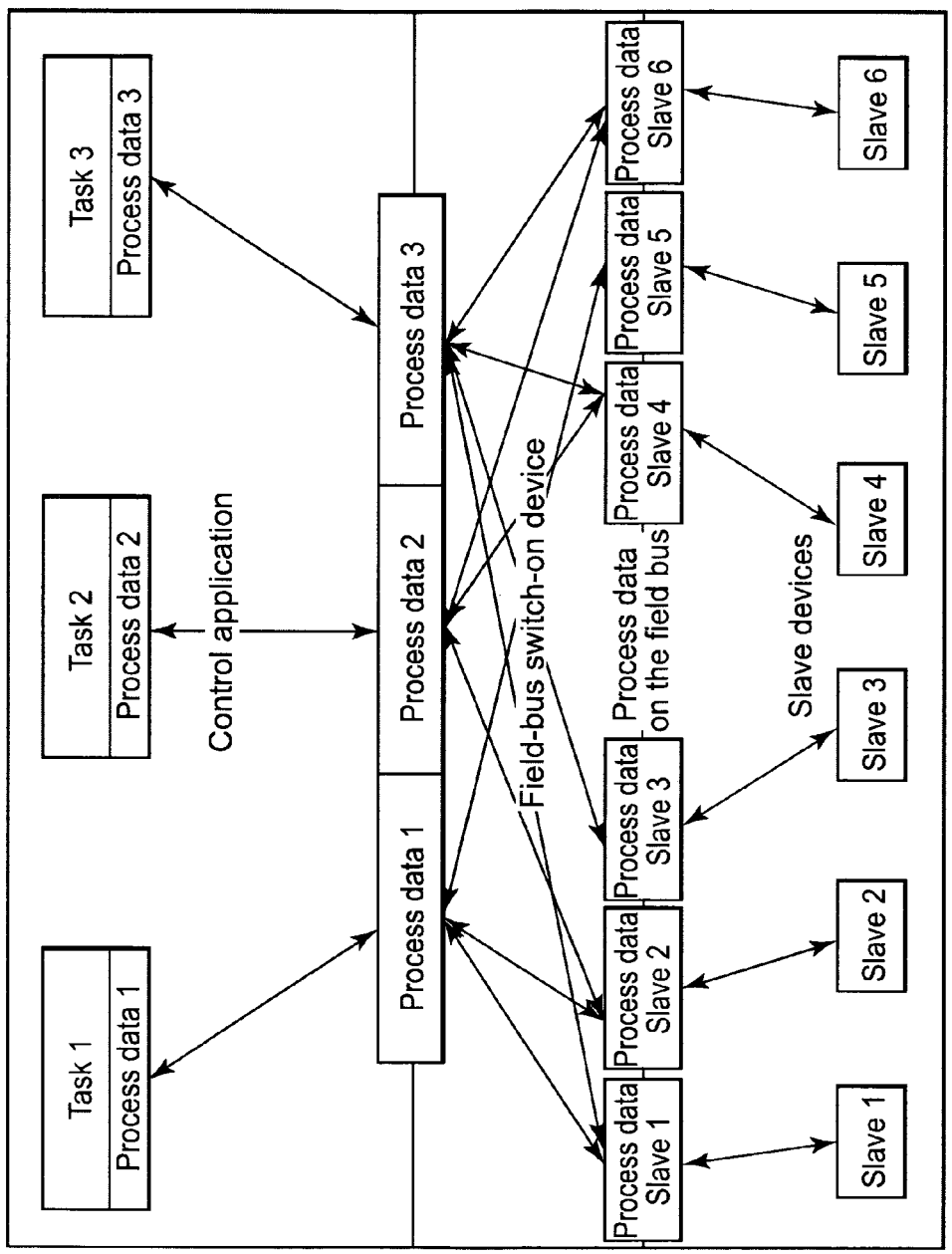
FIG. 2, a conventional process data transfer in a serial bus system, which is used for control applications.

FIG. 2 shows as an example a conventional data transfer between the master device 2, which contains the control application and the field-bus controller, and the slave devices 3 for performing three control tasks, which are designated as task 1, task 2, and task 3 in the master device. To perform these control tasks, input and output process images are used in the master device 2, wherein in FIG. 2 the input process image for task 1 is represented as process data 1, the input process image for task 2 is represented as process data 2, and the input process image for task 3 is represented as process data 3. These input process images are generated by the field-bus switch-on device 23 in the master device 2 on the basis of the process data supplied by the allocation units 33 of the individual slave devices 3 via the field bus.

In the prior art, in order to allocate the data relevant for the slave devices 3 to the individual tasks, thus, the process data to the process images, an allocation method called mapping of the process data of the individual slave devices to the process images is performed. However, this conventional mapping algorithm, which is performed by the field-bus switch-on device 23 in the master device 2, is complex, especially for open field-bus systems in which slave devices can be switched on and off arbitrarily. Furthermore, the process images for the individual tasks are generated by the field-bus switch-on device 23 one after the other, which can lead to considerable time losses in execution of the tasks.

For the conventional data transfer shown in FIG. 2, according to the illustrated control application, process data of task 1 must be exchanged with the slave devices 1, 2, and 5, process data of task 2 must be exchanged with the slave devices 2, 4, and 6, and process data of task 3 must be exchanged with the slave devices 1, 3, and 4, the individual slave devices each being assigned only parts of the process data allocated to the individual tasks because the respective slave devices only execute partial processes of the tasks. In conventional field-bus systems, however, the telegrams cannot be adapted so that the respective slave devices receive only the process data allocated to them. In particular, the telegrams cannot be formed so that the data flow on the field bus is adapted to the different cycle times of the partial processes.

In order to be able to optimally adapt the data transfer to the slave devices for the respective control applications, in this way keeping to a minimum the delay times for mapping the process data of the slave device in the process images of the master device, and in order to achieve a simple implementation of the transmission protocol in the master-slave bus system, according to the invention a data flow in the form of telegrams is made available on the serial bus, so that each slave device can remove or insert exactly the data destined for it.

According to the invention, the mapping is then performed directly in the corresponding slave devices, a parallel mapping process being possible in all the slave devices, which reduces the load on the master device and provides a considerable time advantage in execution of the control tasks. In addition, the device and implementation effort in the field-bus system is considerably reduced by the mapping process according to the invention.

Figure 3:
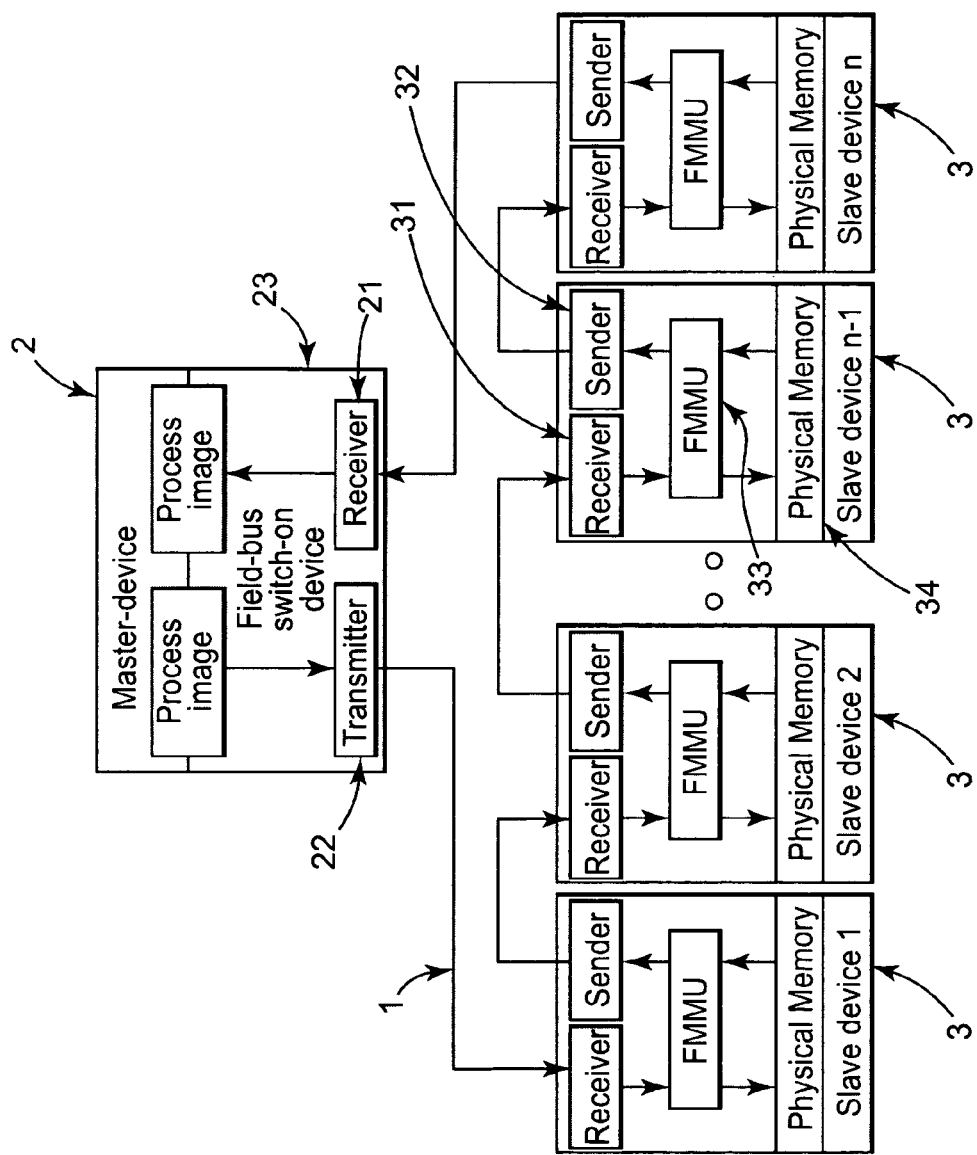
FIG. 3, a schematic diagram of a serial bus system with interface units according to the invention in the slave devices.

FIG. 3 shows a possible configuration of the invention, for which a cyclical field bus, e.g., a Profibus-DP, is used as a serial bus. For one such cyclical field bus, the process data is transmitted on the bus line 1 with the cycle time allocated to the corresponding control task, wherein the data transmission is performed independent of whether the data has changed within this cycle time. However, the invention is not limited to such a cyclical field bus. Alternatively, the field bus can also be configured acyclically, e.g., a CAN bus, for which the process data is transmitted only if it has changed or if the data transmission is explicitly triggered by the master device.

As FIG. 3 shows, the master device 2 and each of the slave devices 3 have a transmitter 22, 32 for output of data onto the bus line 1, and a receiver 21, 31 in FIG. 3, for receiving data from this bus line 1. Transmitters and receivers for a device can be built in a standalone unit in the form of a bus switch-on device, or also can be integrated into the master device or the slave devices themselves. The bus 1 can be configured as an electrical line or also as optical fibers.

The transmitter 21 and the receiver 22 of the master device 2 are connected to the field-bus switch-on device 23 in the master device 2, which implements the overall bus protocol and which controls data transfer via the field bus. This field-bus switch-on device 23 is connected by means of an interface to a data-processing unit in the master device 2, in order to transfer to the master device 2 the input process images necessary for processing the control tasks, or to receive the output process images generated by the master device.

The slave devices 3 each contain the allocation unit 33 which is connected to the receiver 31 and the transmitter 32. In this allocation unit 33, which is also called FMMU (Field-bus Memory Management Unit) in the following, the part of the bus protocol necessary for the respective slave device is implemented. The allocation unit 33 in the slave devices 3 controls the data transfer between the data packets, which are located on the bus line 1 and which are also called telegrams in the following, and the process data stored in a data memory 34 of the slave device 3, which is also called physical memory in FIG. 3. This process data can be, e.g., measurement data or control data for performing a manufacturing process by the corresponding slave device.

The FMMU unit 33 in the slave device 3 can be formed as a standalone structural unit or can be integrated into a control unit. Furthermore, there is the ability to define the functions of the FMMU unit 33, e.g., in the form of an ASIC chip for the respective slave device or also to implement a software solution in a microcontroller in the slave device.

Figure 4:
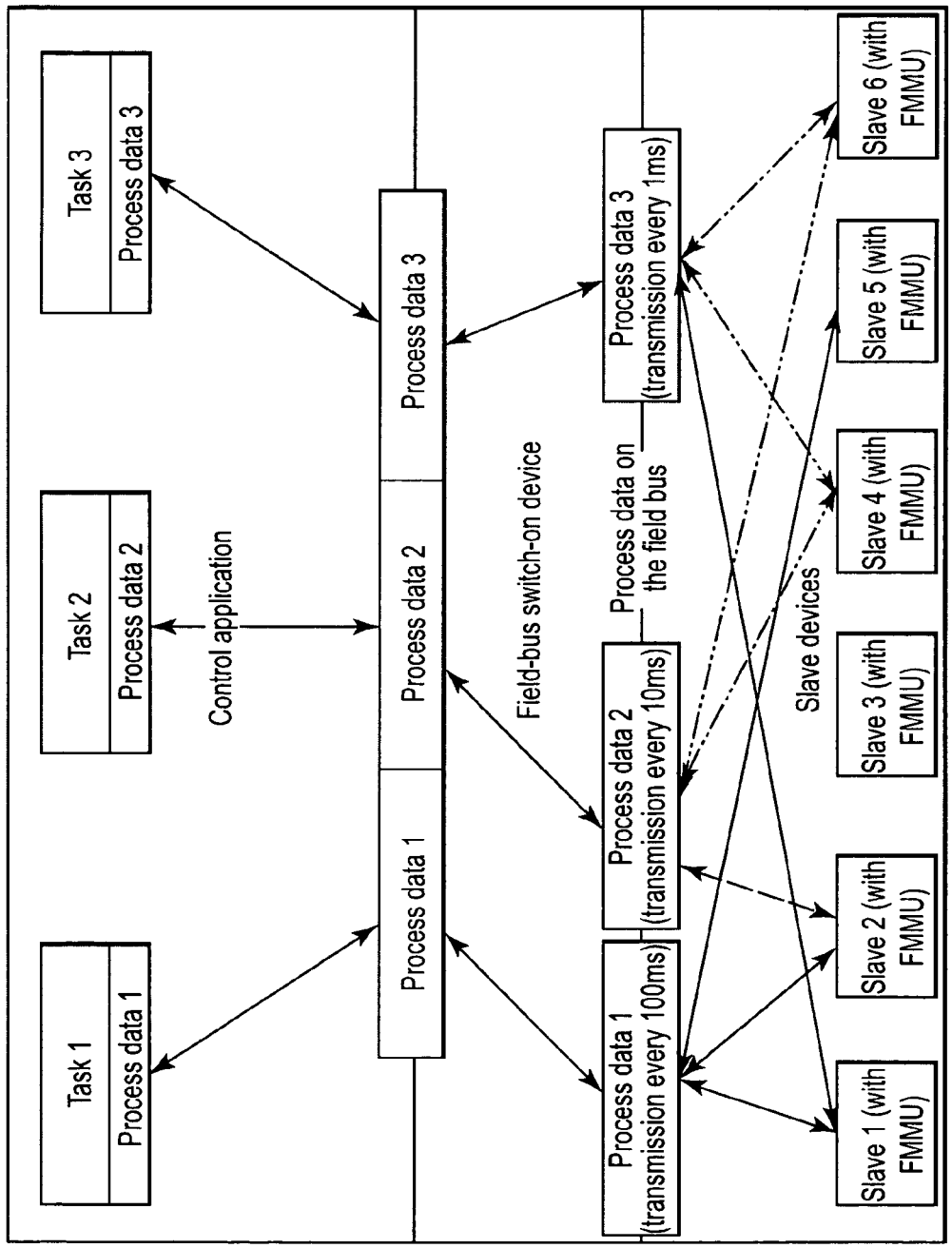
FIG. 4, a process data transfer according to the invention in a serial bus system, which is used for control applications.

FIG. 4 shows schematically a data transmission that can be performed on the field-bus system shown in FIG. 3. As in the conventional process data transfer shown in FIG. 2, it is assumed that three control tasks, task 1, task 2, and task 3 are performed by the master device 2. A process image with process data 1, 2, 3 is allocated to each of these control tasks. These process images for the individual tasks are exchanged between the data processing unit of the master device 2 and the field-bus switch-on device 23, wherein the process images are then output with the help of the transmitter 21 by the field-bus switch-on device 23 onto the field bus 1, or are received by this switch-on device by means of the receiver 22.

For the cyclical field bus shown in FIG. 3, the process images for the master device 2 are transmitted in a process-data-oriented way, i.e., the process image of one task is divided according to size into one or more telegrams that circulate on the field bus. The process data allocated to the respective slave devices of the process images transmitted as telegrams on the field bus are read under the control of the FMMU unit 33 in the corresponding slave device 3 by the receiver 31 of the slave device 3 or output by means of the transmitter 32 of the slave device 3. Allocation of the process data of the slave device 3 to the process images, which are transmitted in telegram form on the field bus, is here performed by the FMMU unit 33 in the slave device 3, so that this allocation of the process data to the process images can be performed by all slave devices on the field bus simultaneously while the telegram is circulating.

For the data transfer shown in FIG. 4, it is possible in a simple way to configure the slave devices according to the control application so that their process data can be transmitted with various telegrams. In an initialization phase, the master device reports to the slave device which telegrams carry its process data, in which part of the allocated data memory the process data is stored, and where this process data is located in the telegrams. During the cyclical control operation, telegrams with process images are then transmitted via the field bus, from which the slave devices remove their output process data or insert their input process data.

As shown in FIG. 4, a data transfer of the process data of task 1 to the slave devices 1, 2, and 5, the process data for the task 2 to the slave devices 2, 4, and 6, and the process data of task 3 to the slave devices 1, 3, 4, and 6 can be performed simply and economically with the aid of the telegrams. Furthermore, according to the invention, the data transfer can be configured so that the slave devices 1 and 2 provide only a part of the process data with telegram 1, the other parts of the process data then being transmitted with telegrams 2 and 3. The data transmission process shown in FIG. 4 is particularly suitable for controlling an application that consists of three partial processes, wherein, for the first partial process the signals change, e.g., every 100 msec, for the second partial process the signals change every 10 msec, and for the third partial process the signals change every 1 msec; and the first partial process requires process data from slave devices 1, 2, and 5, the second partial process requires process data from slave devices 2, 4, and 6, and the third partial process requires process data from slave devices 1, 3, 4, and 6.

Through the data transmission according to the invention, there is the ability to implement telegrams for slave devices that require only 1-bit process data. Therefore, it is no longer necessary, as in conventional field-bus systems, to convert the telegrams from a standard field bus into a local bus to the slave devices that transmits 1-bit process data, so that a simplified and economical slave switch-on device is realized.

Through the flexible configuration of the telegrams, it is also possible for the data flow on the field-bus system to be adapted to partial processes with different cycle times. Thus, by means of appropriately designed telegrams without anything additional, data transmission can be performed for which process data for task 1 must be transmitted every msec, wherein the transmission period of the process data equals 0.5 msec, the process data of task 2 is transmitted every 10 msec, wherein the transmission period of the process data equals 2 msec, and the process data of task 3 is transmitted every 100 msec, wherein the transmission period equals 10 msec. By adapting the telegrams appropriately, a data transmission with an 80% bus load is achieved, wherein the process data for tasks 2 and 3 are each transmitted in several telegrams because for tasks 2 and 3, only 0.5 msec is available in each period of 1 msec.

Through this allocation of process data to the process images circulating on the field bus, this allocation, being shown schematically in FIG. 4, performed by the respective interface units in parallel in all of the slave devices, the load on the field-bus switch-on device in the field-bus system is reduced significantly. In addition, with the help of a simple mapping algorithm in the FMMU unit 33, the allocation process between the process data of the respective slave device 3 and the associated process images of the master device 2 can be performed with only a low protocol and implementation effort.

Figure 5:
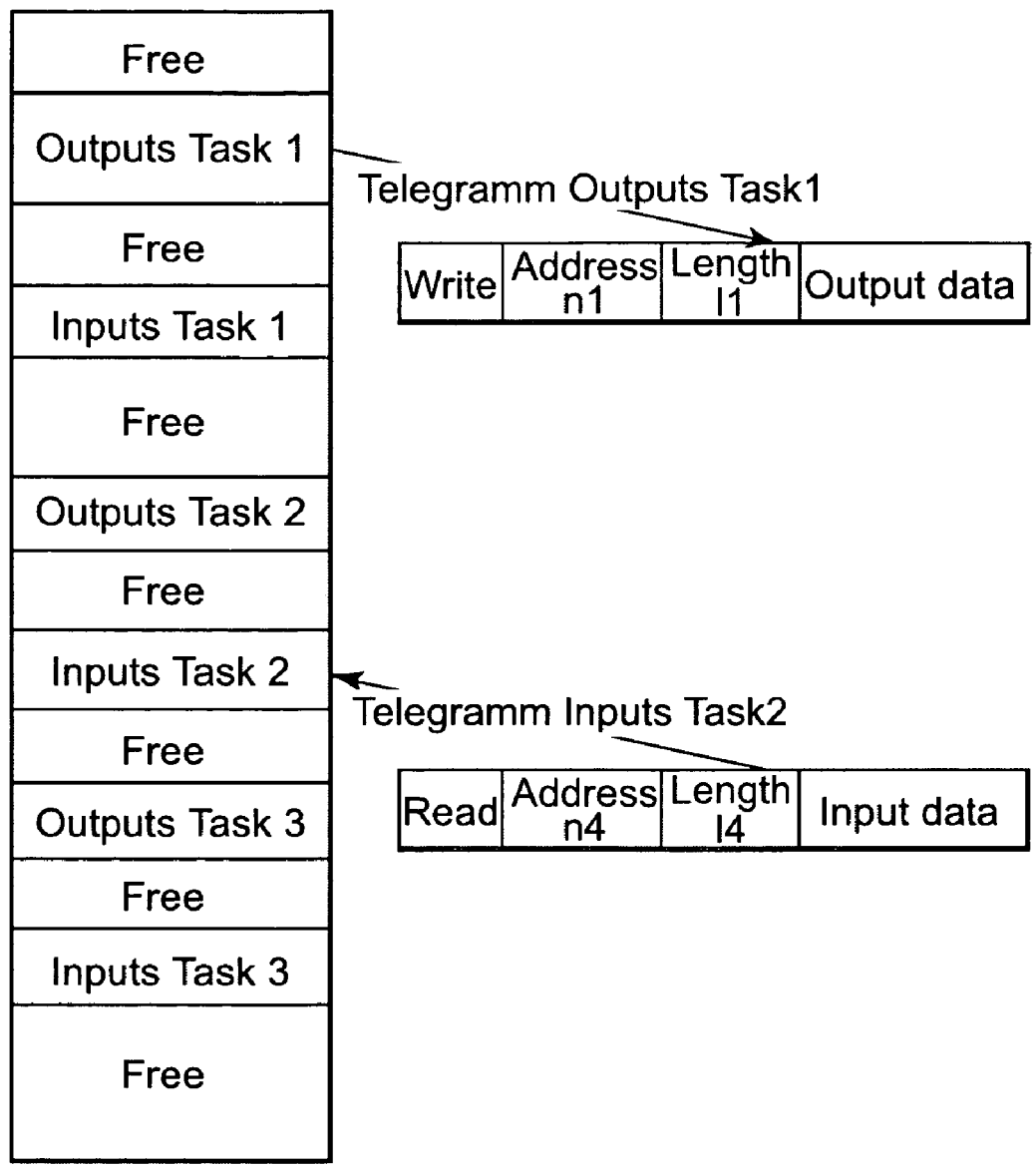
FIG. 5, an arrangement of telegrams with the process images of tasks on a cyclical field bus in the serial bus system.

FIG. 5 shows in detail the arrangement of telegrams on the cyclical field bus used in the embodiment of FIG. 3. Here, the field bus can be considered as a kind of logical memory, wherein the process images of the individual tasks supplied as telegrams can be divided arbitrarily in the logical memory. FIG. 5 shows schematically one possible arrangement of telegrams in the logical memory of the field bus for the three tasks of the master device shown in FIG. 4. Here, free regions in the logical memory of the field bus can be provided between the individual tasks, independent of the process images.

Each telegram of a task is built from two parts, a head part, which acts as a logical address block, and a data part. The logical address block of the telegram is in turn divided into three memory regions, wherein the first memory section gives the data transmission type, i.e., whether the data should be written by the master device into the slave device (write command) and/or whether the data should be transmitted from the slave device to the master device (read command). In a second memory section, the data contained in the telegram is characterized with an address. As an additional memory region, the logical address block contains information on the length of the data contained in the telegram. A data part in which the process data is contained adjoins the address block.

In order for the FMMU unit 33 of the corresponding slave device 3 to recognize the process data allocated to it in the telegrams on the serial bus, this FMMU unit 33 contains an allocation table with several register data sets that correlate the logical memory of the field bus containing the process images to the physical memory in the corresponding slave device containing the process data. Each register data set comprises the following registers, which describe an assembled memory region on the field bus considered as a logical memory: starting address of the logical memory (field bus); ending address of the logical memory (field bus); starting address of the physical memory (slave); type of data transmission "write," "read," or "read/write."

Each register data set thus indicates the beginning of the data allocated to the corresponding slave device in the logical memory of the field bus. By fixing the data end in the register set, the length of the data allocated to the corresponding slave device is then set in the logical field bus memory. Instead of an end address, the register data set could also contain information on the length of the data region in the logical memory. The information contained in the register data set concerning the beginning of the data set in the physical memory of the slave device then provides the allocation of the data contained in the telegrams on the field bus to the data in the slave device. The type of data transmission in the register set then determines whether a writing or reading process or a combined reading-writing process is to be performed between the slave device and the field bus.

The register data sets in the slave devices are generated in an initialization phase of the field-bus system. During the cyclical data traffic on the field bus, the currently transmitted region of the field bus considered as logical memory is then compared with the register data sets of the interface unit in the corresponding slave device by a comparison unit. If there is a match, the corresponding process data is then read from the telegram on the field bus or input into this telegram with the help of an access unit.

Figure 6:
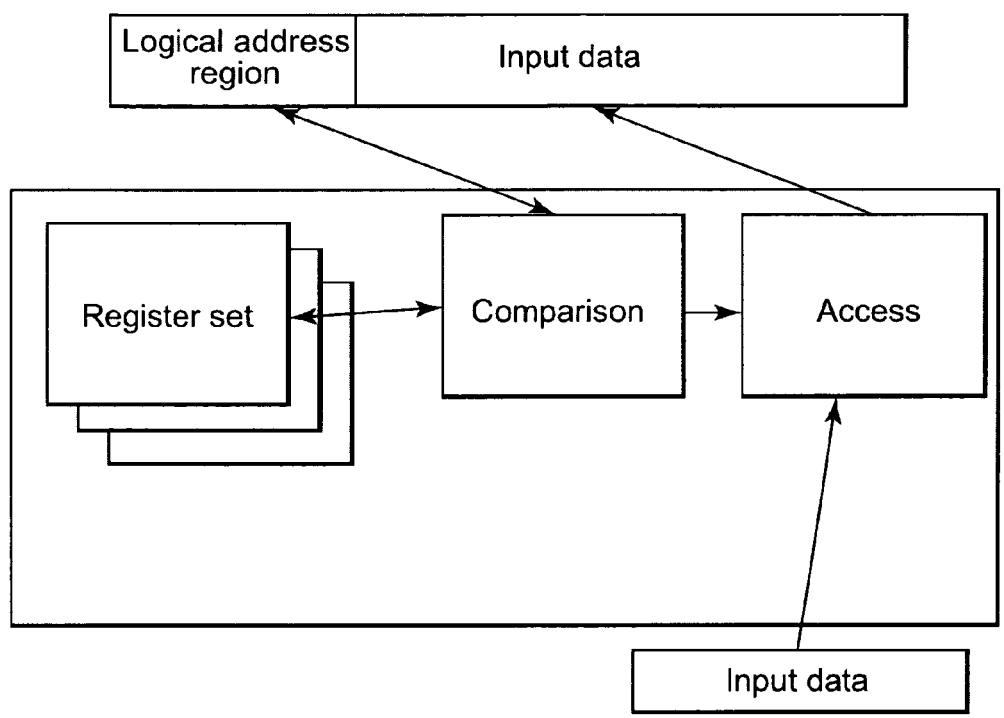
FIG. 6, a flow chart in an interface unit of a slave device according to the invention when a read telegram is received.

FIG. 6 shows the processing sequence in the interface unit of a slave device when a read telegram is received. The head parts of the telegrams circulating on the field bus are compared in the interface unit with the stored register data sets. If this comparison shows that the data part of the telegram contains regions that are allocated to the slave device, these data regions are read from the physical memory of the slave device and input into the corresponding telegram on the field bus.

Figure 7:
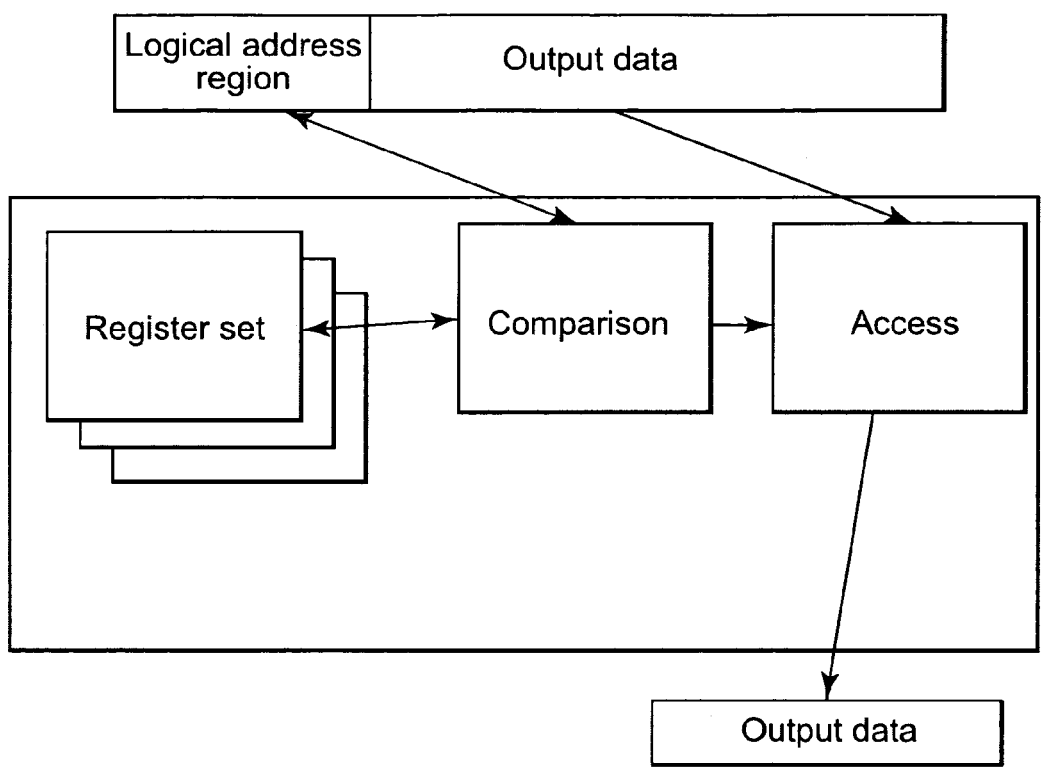
FIG. 7, a flow chart in an interface unit of a slave device according to the invention when a write telegram is received.

FIG. 7 shows the processing sequence in the FMMU unit of a slave device when a write telegram is received. Here, again the head parts of the telegrams on the field bus are compared with the register data sets. If a match is determined and the register data set indicates that a writing process is to be performed, the corresponding data from the telegram on the field bus is then read and stored in the physical memory of the slave device.

As an alternative to the telegram configurations shown in FIGS. 6 and 7, there is also the possibility to process a read/write telegram in the slave device. After comparison of the head part of the telegram on the field bus with the register data sets, if a match is determined, then the corresponding data can be read from the telegram by the slave device while the telegram is circulating and written into the physical memory of the slave device, and simultaneously data regions from the physical memory of the slave device can be read and written to the corresponding locations of the telegram. Here, the processing sequence is preferably limited so that the maximum amount of data that can be written into the telegram corresponds to the amount of data that can be read from the telegram.

Alternatively, it is also possible to use, instead of a telegram with an address region, a simple logical address in the form of a logical number for addressing the respective slave device, this then being stored together with an offset and a data length in the allocation table of the FMMU interface.

The mapping process performed according to the invention by the interface units of the slave devices can be used for all known types of serial bus systems. By performing the mapping process between the process images and the process data directly in the slave device, the delay times for performing control tasks can be kept as low as possible because the mapping can be realized in all slave devices in parallel, and thus the load on the system as a whole can be reduced significantly.

The invention claimed is:

1. Method for transmitting data on a serial bus between at least one active station and at least one passive station, the data being transmitted in the form of circulating telegrams between the active station and the passive station, the method comprising the steps of:
    providing one or more circulating telegrams flowing in a circular path formed by the serial bus, with each circulating telegram starting at an active station, sequentially moving from the active station to the passive station on the serial bus and, after sequentially passing through the passive station on the serial bus, returning to the active station from which it originated, each of the circulating telegrams being outputted onto the serial bus by the active station and containing a logical address and a data portion;
    providing an assignment table in the passive station, the assignment table containing logical addresses of the circulating telegrams, the logical addresses being correlated with physical addresses of data-storage areas of the passive station; and
    while the circulating telegram is passing through the passive stations, comparing the logical address of each circulating telegram with the logical addresses stored in the assignment table of the passive station, and if there is a match, performing a data exchange between the data portion of the circulating telegram and the data-storage area of the passive station, which has the physical address assigned to the logical address.

2. Method according to claim 1, wherein the assignment table has register data sets, each set giving a logical address of data transmitted in a telegram circulating on the serial bus, a physical address of the data storage area assigned to the data in the passive station, and a data transmission type.

3. Method according to claim 2, wherein each register data set contains a starting address of data in the data portion of the telegram circulating on the serial bus, an ending address of the data in the data portion or a data length in the data portion of the telegram circulation on the serial bus, a starting address of the assigned data storage area in the passive station, and a label characterizing the data transmission type as a read and/or write process.

4. Method according to claim 3, wherein the assignment table in the passive station is during an initialization phase.

5. Method according to claim 4, wherein in the initialization phase the active station reports to the passive station the logical addresses of data relevant for the passive stations in the circulating telegrams and the passive station assigns to the logical addresses respective physical addresses of corresponding data storage areas in the passive station.

6. Method according to claim 5, wherein the serial bus is a field bus, data in the active station is provided in the form of process images for control tasks, data in the passive station is provided in the form of process data, telegrams with the process images are transmitted on the field bus, and for a data exchange between the field bus and the passive station, the process data in the passive station is assigned to the corresponding process images in the telegrams circulating on the field bus.

7. Method according to claim 3, wherein the serial bus is a field bus, data in the active station as provided in the form of process images for control tasks, data in the passive station is provided in the form of process data, telegrams with the process images are transmitted on the field bus, and for data transfer between the field bus and the passive station, the process data in the passive station is assigned to the corresponding process images in the telegrams circulating on the field bus.

8. Method according to claim 4, wherein the serial bus is a field bus, data in the active station is provided in the form of process images for control tasks, data in the passive station is provided in the form of process data, telegrams with the process images are transmitted on the field bus, and for data transfer between the field bus and the passive station, the process data in the passive station is assigned to the corresponding process images in the telegrams circulating on the field bus.

9. Method according to claim 2, wherein the assignment table in the passive station is generated during an initialization phase.

10. Method according to claim 9, wherein in the initialization phase the active station reports to the passive station the logical addresses of data relevant for the passive stations in the circulating telegrams and the passive station assigns to the logical addresses respective physical addresses of corresponding data storage areas in the passive station.

11. Method according to claim 10, wherein the serial bus is a field bus, data in the active station is provided in the form of process images for control tasks, and data in the passive station is provided in the form of process data, telegrams with the process images are transmitted on the field bus, and for data transfer between the field bus and the passive station, the process data in the passive station is assigned to the corresponding process images in the telegrams circulating on the field bus.

12. Method according to claim 9, wherein the serial bus is a field bus, data in the active station is provided in the form of process images for control tasks, and data in the passive station is provided in the form of process data, telegrams with the process images are transmitted on the field bus, and data transfer between the field bus and the passive station, the process data in the passive station is assigned to the corresponding process images in the telegrams circulating on the field bus.

13. Method according to claim 2, wherein the serial bus is a field bus, data in the active station is provided in the form of process images for control tasks, data in the passive station is provided in the form of process data, telegrams with the process images are transmitted on the field bus, and data for transfer between the field bus and the passive station, the process data in the passive station is assigned to the corresponding process images in the telegrams circulating on the field bus.

14. Method according to claim 1, wherein the assignment table in the passive station is generated during an initialization phase.

15. Method according to claim 14, wherein in the initialization phase the active station reports to the passive station the logical addresses of data relevant for the passive stations in the circulating telegrams and the passive station assigns to the logical addresses respective physical addresses of corresponding data storage areas in the passive station.

16. Method according to claim 15, wherein the serial bus is a field bus, data in the active station is provided in the form of process images for control tasks, data in the passive station is provided in the form of process data, telegrams with the process images are transmitted on the field bus, and for data transfer between the field bus and the passive station, the process data in the passive station is assigned to the corresponding process images in the telegrams circulating on the field bus.

17. Method according to claim 14, wherein the serial bus is a field bus, data in the active station is provided in the form of process images for control tasks, data in the passive station is provided in the form of process data, telegrams with the process images are transmitted on the field bus, and for data transfer between the field bus and the passive station, the process data in the passive station is assigned to the corresponding process images in the telegrams circulating on the field bus.

18. Method according to claim 1, wherein the serial bus is a field bus, data in the active station is provided in the form of process images for control tasks, data in the passive station is provided in the form of process data, telegrams with the process images are transmitted on the field bus, and for data transfer between the field bus and the passive station, the process data in the passive station is assigned to the corresponding process images in the telegrams circulating on the field bus.

19. A serial bus system comprising:
at least one active station (2), wherein the active station (2) transmits data in the form of circulating telegrams, each telegram having a logical address and a data portion;
at least one passive station, the passive station having an assignment table containing logical addresses of circulating telegrams, the logical addresses being correlated with physical addresses of data storage areas of the passive station; and
an assignment unit, which, while a circulating telegram is passing through the passive station, compares the logical address of the circulating telegram with the logical addresses stored in the assignment table and performs a data exchange between the assigned data storage area and the circulating telegram, if there is a match,
circulating telegrams flowing in a circular path formed by the serial bus, with each circulating telegram starting at an active station, sequentially moving from the active station to the passive station on the serial bus and, after sequentially passing through the passive station on the serial bus, returning to the active station from which it originated.

20. Bus system according to claim 19, wherein the assignment table has register data sets, each set giving a logical address of data transmitted in a telegram circulating on the serial bus, a physical address of the data storage area assigned to the data in the passive station, and a data transmission type.

21. Bus system according to claim 20, wherein the serial bus is a field bus, data in the active station is provided in the form or process images for control tasks, and data in the passive station provided in the form of process data, the assignment unit of the passive station connects the data storage area in the passive station, which contains the process data, to the field bus in order to assign the process data in the data storage area to the process images contained in the telegrams on the field bus for a data exchange between the field bus and the passive station.

22. Bus system according to claim 21, wherein the active station has a field-bus switch-on device that performs the transfer of the process images between a data processing unit in the active station and the field bus.

23. Bus system according to claim 19, wherein the serial bus is a field bus, data in the active station is provided in the form of process images for control tasks, data in the passive station is provided in the form of process data, the assignment unit of the passive station connects the data storage area in the passive station, which contains the process data, to the field bus in order to assign the process data in the data memory storage area to the process images contained in the telegrams on the field bus for a data exchange between the field bus and the passive station.

24. Bus system according to claim 23, wherein the active station has a field-bus switch-on device that performs the transfer of the process images between a data processing unit in the active station and the field bus.

25. A switch-on unit in a passive station in a serial bus system for performing a data transfer with a bus to which at least one active station and at least one passive station are attached, wherein the active station transfer the data in the form of circulating telegrams, each circulating telegram having a logical address and a data portion, each circulating telegram flowing in a circular path formed by the serial bus, with each circulating telegram starting at an active station, sequentially moving from the active station to the one passive station on the serial bus and, after sequentially passing through each passive station on the serial bus, returning to the active station from which it originated, the switch-on unit comprising:
- an assignment unit having an assignment table, the assignment table containing logical addresses of circulating telegrams, the logical addresses being correlated with physical addresses of data storage memory areas of the passive Station; and
- a control unit, while the circulating telegram is passing through the passive station, comparing the logical address of each circulating telegram with the logical addresses stored in the assignment table and performing a data exchange between the assigned data storage area and the circulating telegram, if there is a match.

26. Switch-on unit according to claim 25, wherein the assignment table has register data sets, each set giving a logical address of data transmitted in a telegram circulating on the serial bus, a physical address of the data storage area in the passive station assigned to the data, and a data transmission type.

27. Switch-on unit according to claim 26, wherein each register data set contains a starting address of data in the data portion of the telegram circulating on the serial bus, an ending address of the data in the data portion or a data length in the data portion in the telegram circulating on the serial bus, a starting address of the assigned data storage area in the passive station, and a label characterizing the data transmission type as a read and/or write process.

28. Switch-on unit according to claim 27, wherein the assignment table is generated during an initialization phase.

29. Switch-on unit according to claim 26, wherein the assignment table is generated during an initialization phase.

30. Switch-on unit according to claim 25, wherein each register data set contains a starting address of data in the data portion of the telegram circulating on the serial bus, an ending address of the data in the data portion or a data length in the data portion of the telegram circulating on the serial bus, a starting address of the assigned data storage area in the passive station, and a label characterizing the data transmission type as a read and/or write process.

31. Switch-on unit according to claim 30, wherein the assignment table is generated during an initialization phase.

32. Switch-on unit according to claim 25, wherein the assignment table is generated during an initialization phase.

* * * * *

UNITED STATES PATENT AND TRADEMARK OFFICE
CERTIFICATE OF CORRECTION

PATENT NO. : 7,702,834 B2
APPLICATION NO. : 10/499724
DATED : April 20, 2010
INVENTOR(S) : Hans Beckhoff et al.

It is certified that error appears in the above-identified patent and that said Letters Patent is hereby corrected as shown below:

Cancel the text of claims 1-32 beginning at col. 10, line 6 with "1. Method for transmitting data on a serial bus" and ending at col. 14, line 31 with "during an initialization phase." and replace with the following:

-- 1. Method for transmitting data on a serial bus between at least one active station and at least one passive station, for which the data is transmitted in the form of circulating telegrams between the active station and the passive station, the method comprising the steps of:
    providing one or more circulating telegrams configured to flow in a circular path formed by a serial bus, with each circulating telegram starting at an active station, sequentially moving from the active station to the at least one passive station on the serial bus and, after sequentially passing through each passive system on the serial bus, returning to the active station from which it originated;
    including a logical address in each of the circulating telegrams when the data is output onto the serial bus by the active station, the logical address characterizing the transmitted data;
    providing an assignment table in the passive station, in which logical addresses of the circulating telegrams are correlated with physical addresses of data-storage areas of the passive station; and
    comparing the logical address of each circulating telegram with the logical addresses stored in the assignment table by the passive station while the circulating telegram is circulated on the serial bus, and if there is a match, performing a data exchange between the circulating telegram and the data-storage area, which has the physical address assigned to the logical address.

2.     Method according to Claim 1, wherein the assignment table has register data sets, which each give a logical address of data transmitted in a telegram via the serial bus, a physical address of the data storage region assigned to the data in the passive station, and a data transmission type.

3.     Method according to Claim 2, wherein a register data set contains a starting address of data in a telegram on the serial bus, an ending address of the data or a length of a data storage region in the telegram on the serial bus, a starting address of the assigned storage region in the Signed and Sealed this Twenty-second Day of June, 2010

David J. Kappos
*Director of the United States Patent and Trademark Office* passive station, and a label characterizing the data transmission type as a read and/or write process.

4. Method according to Claim 3, wherein the assignment table in the passive station is generated during an initialization phase.

5. Method according to Claim 4, wherein in the initialization phase the active station reports to the passive station the logical addresses of data relevant for the passive stations in the telegrams and the passive station assigns to the logical addresses respective physical addresses of corresponding data memory regions.

6. Method according to Claim 5, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

7. Method according to Claim 3, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

8. Method according to Claim 4, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

9. Method according to Claim 2, wherein the assignment table in the passive station is generated during an initialization phase.

10. Method according to Claim 9, wherein in the initialization phase the active station reports to the passive station the logical addresses of data relevant for the passive stations in the telegrams and the passive station assigns to the logical addresses respective physical addresses of corresponding data memory regions.

11. Method according to Claim 10, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

12. Method according to Claim 9, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

13. Method according to Claim 2, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

14. Method according to Claim 1, wherein the assignment table in the passive station is generated during an initialization phase.

15. Method according to Claim 14, wherein in the initialization phase the active station reports to the passive station the logical addresses of data relevant for the passive stations in the telegrams and the passive station assigns to the logical addresses respective physical addresses of corresponding data memory regions.

16. Method according to Claim 15, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

17. Method according to Claim 14, wherein the serial bus is a field bus, data in the active station is provided in the form of process images for control tasks, and data in the passive station is provided in the form of process data, wherein telegrams with the process images arc transmitted on the field bus, and wherein for a data transfer between the field bus and the passive station, the process data in the passive station is assigned to the corresponding process images in the telegrams circulating on the field bus.

18. Method according to Claim 1, wherein the serial bus is a field bus, data in the active station is provided in the form of process images for control tasks, and data in the passive station is provided in the form of process data, wherein telegrams with the process images are transmitted on the field bus, and wherein for a data transfer between the field bus and the passive station, the process data in the passive station is assigned to the corresponding process images in the telegrams circulating on the field bus.

19. Serial bus system comprising:
    at least one active station (2), wherein the active station (2) transmits data in the form of circulating telegrams with a logical address that characterizes the data contained in the corresponding circulating telegrams, each circulating telegram configured to flow in a circular path formed by a serial bus, with each circulating telegram starting at an active station, sequentially moving from the active station to at least one passive station on the serial bus and, after sequentially passing through each passive system on the serial bus, returning to the active station from which it originated;

at least one passive station (3), wherein the passive station has an assignment table (33) in which logical addresses of the circulating telegrams are correlated with physical addresses of data memory regions (34) of the passive station; and an assignment unit (33) configured to compare the logical address of a circulating telegram with the logical address stored in the assignment table while the circulating telegram is circulating on the serial bus (1) and to perform a data exchange between the assigned data storage region and the circulating telegram if there is a match.

20. Bus system according to Claim 19, wherein the assignment table has register data sets that each give a logical address of data transmitted by means of the serial bus in a telegram, a physical address of the data storage region assigned to the data in the passive station, and a data transmission type.

21. Bus system according to Claim 20, wherein the serial bus (1) is a field bus, data in the active station (2) is provided in the form of process images for control tasks, and data in the passive station (3) is provided in the form of process data, wherein the assignment unit (33) of the passive station connects the data memory (34) in the passive station, which contains the process data, to the field bus in order to assign the process data in the data memory to the process images contained in the telegrams on the field bus for a data transfer between the field bus and the passive station.

22. Bus system according to Claim 21, wherein the active station has a field-bus switch-on device (23) that performs the transfer of the process images between a data processing unit in the active station (2) and the field bus (1).

23. Bus system according to Claim 19, wherein the serial bus (1) is a field bus, data in the active station (2) is provided in the form of process images for control tasks, and data in the passive station (3) is provided in the form of process data, wherein the assignment unit (33) of the passive station connects the data memory (34) in the passive station, which contains the process data, to the field bus in order to assign the process data in the data memory to the process images contained in the telegrams on the field bus for a data transfer between the field bus and the passive station.

24. Bus system according to Claim 23, wherein the active station has a field-bus switch-on device (23) that performs the transfer of the process images between a data processing unit in the active station (2) and the field bus (1).

25. Switch-on unit for a passive station in a serial bus system for performing a data transfer with a bus (1) to which at least one active station (2) and at least one passive station (3) are attached, wherein the active station (2) transfers the data in the form of circulating telegrams with a logical address that characterizes the data contained in the respective circulating telegrams, each circulating telegram configured to flow in a circular path formed by the serial bus, with each circulating telegram starting at an active station, sequentially moving from the active station to the at least one passive station on the serial bus and, after sequentially passing through each passive system on the serial bus, returning to the active station from which it originated, the switch-on unit comprising:

an assignment unit (33) having an assignment table in which logical addresses of the circulating telegrams are correlated with physical addresses of data memory regions of the passive station, and a control unit (33) configured to compare the logical address of each circulating telegram with the logical addresses stored in the assignment table while the circulating telegram is circulating on the serial bus and to perform a data exchange between the assigned data storage region and the circulating telegram if there is a match.

26. Switch-on unit according to Claim 25, wherein the assignment table has register data sets that each give a logical address of data transmitted by means of the serial bus (1) in a telegram, a physical address of the data memory region (34) in the passive station assigned to the data, and a data transmission type.

27. Switch-on unit according to Claim 26, wherein a register data set contains a starting address of data in a telegram on the serial bus, an ending address of the data or a length of a data region in the telegram on the serial bus, a starting address of the associated memory region in the passive station, and a label characterizing the data transmission type as a read and/or write process.

28. Switch-on unit according to Claim 27, wherein the assignment table is generated during an initialization phase.

29. Switch-on unit according to Claim 26, wherein the assignment table is generated during an initialization phase.

30. Switch-on unit according to Claim 25, wherein a register data set contains a starting address of data in a telegram on the serial bus, an ending address of the data or a length of a data region in the telegram on the serial bus, a starting address of the associated memory region in the passive station, and a label characterizing the data transmission type as a read and/or write process.

31. Switch-on unit according to Claim 30, wherein the assignment table is generated during an initialization phase.

32. Switch-on unit according to Claim 25, wherein the assignment table is generated during an initialization phase. --